US011308530B2

(12) United States Patent
DeLuca et al.

(10) Patent No.: US 11,308,530 B2
(45) Date of Patent: Apr. 19, 2022

(54) AUTOMATED PERSONALIZED CUSTOMER SERVICE UTILIZING LIGHTING

(71) Applicant: INTERNATIONAL BUSINESS MACHINES CORPORATION, Armonk, NY (US)

(72) Inventors: Lisa Seacat DeLuca, Baltimore, MD (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 383 days.

(21) Appl. No.: 16/013,266

(22) Filed: Jun. 20, 2018

(65) Prior Publication Data
US 2019/0392490 A1    Dec. 26, 2019

(51) Int. Cl.
*G06Q 30/02*    (2012.01)
*G06Q 30/00*    (2012.01)
*F21V 21/03*    (2006.01)
*G01C 21/20*    (2006.01)
*G06F 16/9038*    (2019.01)

(52) U.S. Cl.
CPC ......... *G06Q 30/0281* (2013.01); *F21V 21/03* (2013.01); *G01C 21/206* (2013.01); *G06F 16/9038* (2019.01); *G06Q 30/016* (2013.01)

(58) Field of Classification Search
CPC .............. G06Q 30/0281; G06Q 30/016; G06F 16/9038; F21V 21/03; G01C 21/206
See application file for complete search history.

(56) References Cited

U.S. PATENT DOCUMENTS

| 5,127,674 A | 7/1992 | Lamphere et al. |
| 6,314,406 B1 | 11/2001 | O'Hagan et al. |
| 6,728,706 B2 | 4/2004 | Aggarwal et al. |
| 7,010,498 B1 | 3/2006 | Berstis |

(Continued)

OTHER PUBLICATIONS

Priyadharshini, N., V. Sivaranjani, and R. Kanimozhi. "Visible Light Communication Appliances Used in Indoor Communication." (Year: 2017).*

(Continued)

*Primary Examiner* — Richard W. Crandall
*Assistant Examiner* — Corey Russ
(74) *Attorney, Agent, or Firm* — Daniel Yeates; Andrew D. Wright; Roberts Calderon Safran & Cole, P.C.

(57) ABSTRACT

Systems and methods for automated personalized customer service are disclosed. In embodiments, a method comprises: determining, by a computing device, at least one object from a plurality of objects within a venue matches a search query received from a user; assigning to the user, by the computing device, a select lighting type from a plurality of available lighting types, wherein the select lighting type is not available for the computing device to assign to other users while assigned to the user; providing, by the computing device, a notification to the user regarding the select lighting type; selecting, by the computing device, a target lighting device from a plurality of lighting devices within the venue, the target lighting device being associated with the at least one object; initiating, by the computing device, a first illumination event of the target lighting device based on the select lighting type.

20 Claims, 5 Drawing Sheets

(56) References Cited

U.S. PATENT DOCUMENTS

| | | | |
|---|---|---|---|
| 7,672,865 B2 | 3/2010 | Kumar et al. | |
| 2004/0039661 A1* | 2/2004 | Fuzell-Casey | G06Q 30/0635 |
| | | | 705/26.81 |
| 2008/0309630 A1* | 12/2008 | Westerman | G06F 3/0418 |
| | | | 345/173 |
| 2009/0096628 A1* | 4/2009 | Moscovitch | G09F 27/00 |
| | | | 340/691.6 |
| 2009/0240518 A1* | 9/2009 | Borom | G06Q 30/0633 |
| | | | 705/14.1 |
| 2011/0251918 A1* | 10/2011 | Yarvis | G06Q 30/0631 |
| | | | 705/26.7 |
| 2012/0023034 A1* | 1/2012 | Lynch | G06Q 30/06 |
| | | | 705/346 |
| 2013/0166193 A1* | 6/2013 | Goldman | G01C 21/206 |
| | | | 701/410 |
| 2013/0271004 A1* | 10/2013 | Min | H05B 47/105 |
| | | | 315/112 |
| 2014/0095285 A1* | 4/2014 | Wadell | G06Q 30/00 |
| | | | 705/14.25 |
| 2015/0038165 A1* | 2/2015 | Tuo | H05B 47/19 |
| | | | 455/456.1 |
| 2015/0278928 A1 | 10/2015 | Nichols et al. | |
| 2015/0294398 A1 | 10/2015 | Khalid et al. | |
| 2015/0382144 A1* | 12/2015 | Lopez | H04W 4/023 |
| | | | 455/456.2 |
| 2016/0035011 A1* | 2/2016 | Tuo | G06Q 30/0267 |
| | | | 705/14.64 |
| 2016/0110799 A1* | 4/2016 | Herring | G06Q 30/016 |
| | | | 705/26.81 |
| 2016/0123741 A1* | 5/2016 | Mountain | H04N 5/44 |
| | | | 701/533 |
| 2016/0223339 A1* | 8/2016 | Pellow | G06Q 30/0639 |
| 2016/0292975 A1* | 10/2016 | Boullery | H05B 45/40 |
| 2016/0356605 A1 | 12/2016 | Zur et al. | |
| 2017/0039613 A1* | 2/2017 | Kaehler | G02B 27/0172 |
| 2017/0228816 A1* | 8/2017 | Joppi | A47F 5/0043 |
| 2017/0372403 A1* | 12/2017 | Jouhikainen | G06Q 20/202 |
| 2018/0012259 A1 | 1/2018 | Lazo | |
| 2018/0040037 A1* | 2/2018 | Blair, II | G01C 21/206 |
| 2018/0053239 A1* | 2/2018 | Li | G06F 16/22 |
| 2018/0101892 A1* | 4/2018 | Pandey | G06F 16/29 |
| 2018/0103078 A1* | 4/2018 | Goswami | H04L 65/604 |
| 2018/0108078 A1* | 4/2018 | Howell | G06Q 30/0259 |
| 2018/0239026 A1* | 8/2018 | Veitsel | G01S 19/27 |
| 2018/0348338 A1* | 12/2018 | Li | G01S 1/7038 |
| 2019/0103915 A1* | 4/2019 | Stout | H04N 5/2353 |
| 2021/0056580 A1* | 2/2021 | Walker | G06T 11/00 |
| 2021/0090156 A1* | 3/2021 | Deveaux | G06F 16/24575 |
| 2021/0142226 A1* | 5/2021 | Sahni | G06Q 30/0267 |

OTHER PUBLICATIONS

Komine, Toshihiko, and Masao Nakagawa. "Fundamental analysis for visible-light communication system using LED lights." IEEE transactions on Consumer Electronics 50.1 (2004): 100-107 (Year: 2004).*

Goel et al., "Lighting the Way Toward Seamless Pickups with Uber Beacon", https://newsroom.uber.com/beacon/, Dec. 15, 2016, 2 pages.

* cited by examiner

AUTOMATED PERSONALIZED CUSTOMER SERVICE UTILIZING LIGHTING

BACKGROUND

The present invention relates generally to computer-implemented customer service and, more particularly, to automated personalized customer service utilizing lighting.

Various computer implemented methods have been explored for guiding users to items in a retail venue or the like. Some systems have been developed that utilize sensors to determine when a user is within a certain distance of a product display or item of interest and initiate an indicator to alert the user that they are near an item of interest. Other systems successively illuminate lights along a path to guide a user to an item or interest.

SUMMARY

In an aspect of the invention, a computer-implemented method includes: determining, by a computing device, at least one object from a plurality of objects within a venue matches a search query received from a user; assigning to the user, by the computing device, a select lighting type from a plurality of available lighting types, wherein the select lighting type is not available for the computing device to assign to other users while assigned to the user; providing, by the computing device, a notification to the user regarding the select lighting type; selecting, by the computing device, a target lighting device from a plurality of lighting devices within the venue, the target lighting device being associated with the at least one object; initiating, by the computing device, a first illumination event of the target lighting device based on the select lighting type.

In another aspect of the invention, there is a computer program product for automated personalized customer service. The computer program product comprises a computer readable storage medium having program instructions embodied therewith. The program instructions are executable by a computing device to cause the computing device to: determine at least one object from a plurality of objects within a venue matches a search query received from a user; assign a select lighting type from a pool of available lighting types to the user, wherein the select lighting type is removed from the pool of available lighting types while assigned to the user; provide a notification to the user regarding the select lighting type; select a target lighting device from a plurality of lighting devices within the venue, the target lighting device being associated with the at least one object; initiate a first illumination event of the target lighting device based on the select lighting type; un-assign the select lighting type from the user, wherein the select lighting type is returned to the pool of available lighting types.

In another aspect of the invention, there is a system for automated personalized customer service. The system includes a plurality of lighting devices each configured to be selectively illuminated in one of a plurality of colors; a processor, a computer readable memory and a computer readable storage medium associated with a computing device; program instructions to receive a search query from a user; program instructions to determine that at least one object from a plurality of objects within a venue matches the search query; program instructions to assign to the user a select color from the plurality of colors, wherein the select color is removed from a list of available colors once assigned to the user; program instructions to select a target lighting device from the plurality of lighting devices based on the target lighting device being associated with the at least one object; program instructions to provide a notification to the user indicating that the user should look for the target lighting device with the select color; and program instructions to initiate a first illumination event of the target lighting device to illuminate the target lighting device in the select color; wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computer-implemented customer service and, more particularly, to automated personalized customer service utilizing lighting. In embodiments, a system is provided including multicolor-enabled lighting devices mounted within a venue, and a computer device for receiving a search query regarding the location of an item of interest in the venue and initiating a lighting event to visually highlight the location to the user. Embodiments of the invention may be utilized in a variety of different venues, including for example, grocery stores, bookstores, libraries, museums, corporate buildings, or shopping malls. In embodiments, the computer device assigns an available lighting type (color, lighting sequence, lighting brightness, or combination thereof) to a user, and sends a notification to the user indicating that they should look for the lighting type to locate the item of interest within the venue. After the user reaches the item of interest, or after a predetermined amount of time, the lighting event will end and the lighting type will be released and available to be assigned to another user by the computer device.

Advantageously, embodiments of the invention provide a technical solution to the problem of locating objects within a venue. In aspects, unconventional steps are utilized by a locating server to assign a lighting type from a list of available lighting types (e.g., a list of available lighting colors) to a user upon receipt of the user's search query, and initiate a lighting event based on the assigned lighting type to aid the user in finding an item of interest within a venue. Embodiments of the invention enable the lighting type to be returned to the list of available lighting types and used for future lighting events involving different users. In aspects, a system is provided that does not require means for tracking users through the venue, but instead provides customized guidance to a user though a temporarily assigned lighting type (e.g., lighting color). In embodiments, multicolored lights are mounted to a ceiling at a venue, and a light closest to the item if interest is illuminated with a user-assigned color for a predetermined period of time in response to a query regarding the location of the item.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
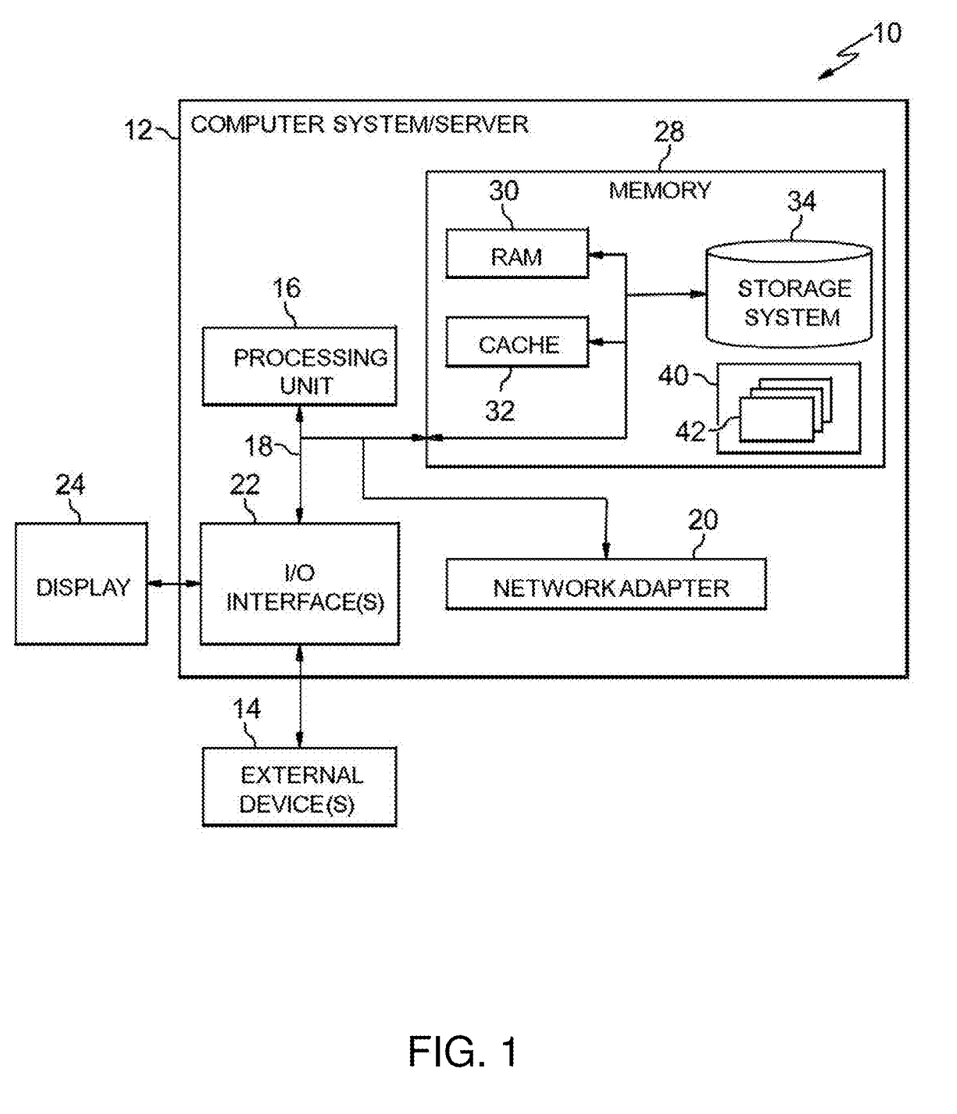
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
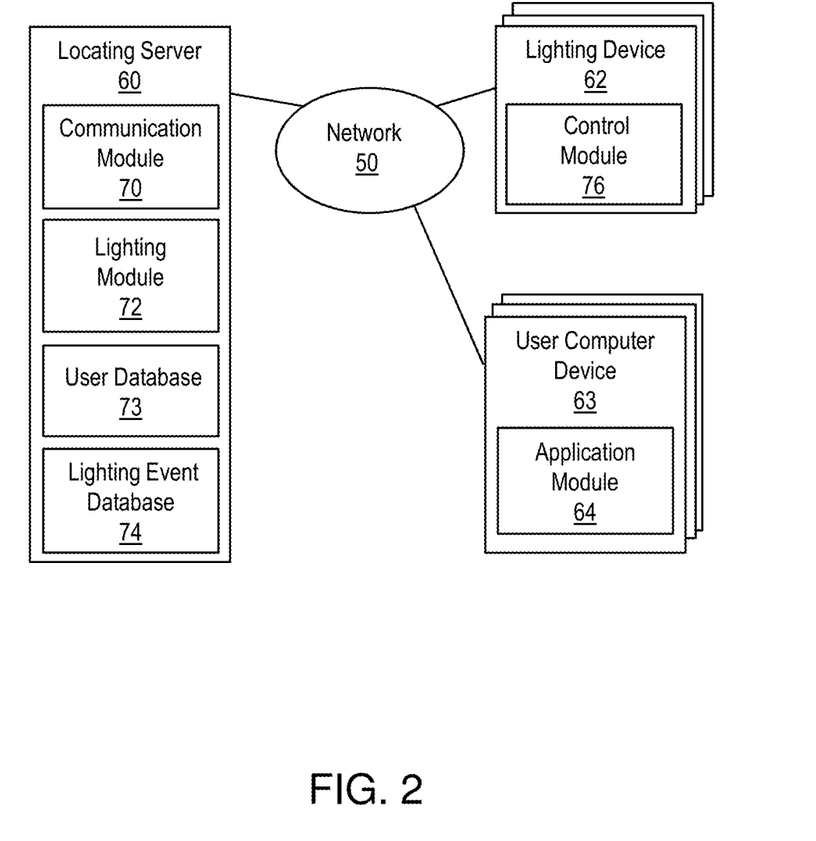
FIG. 2 shows an exemplary environment in accordance with aspects of the invention.

FIG. 2 shows an exemplary environment in accordance with aspects of the invention. The environment includes a network 50 connecting a locating server 60 to one or more lighting devices 62. In embodiments, the locating server 60 is in communication with one or more user computer devices 63 through the network 50. The locating server 60 may comprise a computer system 12 of FIG. 1, and may be connected to the network 50 via the network adapter 20 of FIG. 1. The locating server 60 may be configured as a special purpose computing device that is part of a venue's customer service infrastructure. For example, the locating server 60 may be a customer service kiosk configured to directly receive a search query from a user regarding the location of one or more objects in a venue (not depicted in FIG. 1). Alternatively or additionally, the locating server 60 may be a special purpose computing device configured to receive a search query from one or more user computer devices 63 via the network 50.

The network 50 may be any suitable communication network or combination of networks, such as a local area network (LAN), a general wide area network (WAN), and/or a public network (e.g., the Internet). The user computer device 63 may be in the form of the computer device 12, and may be a desktop computer, laptop computer, tablet computer, smartphone, kiosk, dedicated in-store mobile device (e.g., self-scanning device) or other device configured to receive a user search query and issue notifications to the user (e.g., instructions to locate an item of interest that matches the search query). In embodiments, the user computer device 63 includes an application module 64 configured to run an application program that provides an interface (e.g., a web page) by which a user may enter (e.g., type) a search query. In embodiments, the user computer device 63 is configured to submit the search query to the locating server 60 via the network 50. The locating server 60 may be configured to communicate with plural different user computer devices 63 simultaneously, and perform locating functions separately for each user computer device 63 independent of the others.

Still referring to FIG. 2, the locating server 60 may include a plurality of modules configured to perform one or more functions described herein, wherein the modules may include one or more program modules (e.g., program module 42 of FIG. 1) executed by the locating server 60. In embodiments, a communication module 70 is configured to receive a user search query, either directly (e.g., through a graphical user interface (GUI)), or from a user computer device 63 via the network 50. In aspects, the user search query received at the locating server 60 includes at least one object to be located within a venue. It should be understood that objects located by embodiments of the invention may include different types of physical objects, such as products for sale, restrooms, named spaces (e.g., printer room, department), users (e.g., mobile developers, offering managers), and nearby people or objects. In embodiments, the locating server 60 includes a lighting module 72 configured to send control signals to respective control modules 76 of the lighting devices 62 to control illumination of one or more lights of the respective lighting devices 62. In embodiments, control signals may include instructions to illuminate one or more lights for a predetermined amount of time at a select color and/or illumination pattern (e.g., predetermined flashing or blinking light pattern). The lighting module 72 may have access to a user database 73 of the locating server 60. The user database 73 may include user profile information of one or more users of the locating server 60. The lighting module 72 may also have access to a lighting event database 74, including lighting event data for a plurality of different lighting events. Lighting event data may include predetermined illumination instructions for one or more of the lighting devices 62.

In embodiments, the lighting devices 62 each comprise one or more lights configured to turn on or off (i.e. to be lit or unlit) based on commands received from the locating server 60. The lighting device 62 may utilize light emitting diodes (LEDs) or other types of lights. In aspects, each lighting device 62 comprises a multicolor-enabled lighting device configured to be illuminated in any one of a plurality of predetermined colors.

In embodiments, the locating server 60, lighting devices 62 and user computer devices 63 may include additional or fewer components than those shown in FIG. 2. In embodiments, separate components of the locating server 60 may be integrated into a single computing component or module. Additionally, or alternatively, a single component of the locating server 60 may be implemented as multiple computing components or modules.

Figure 3:
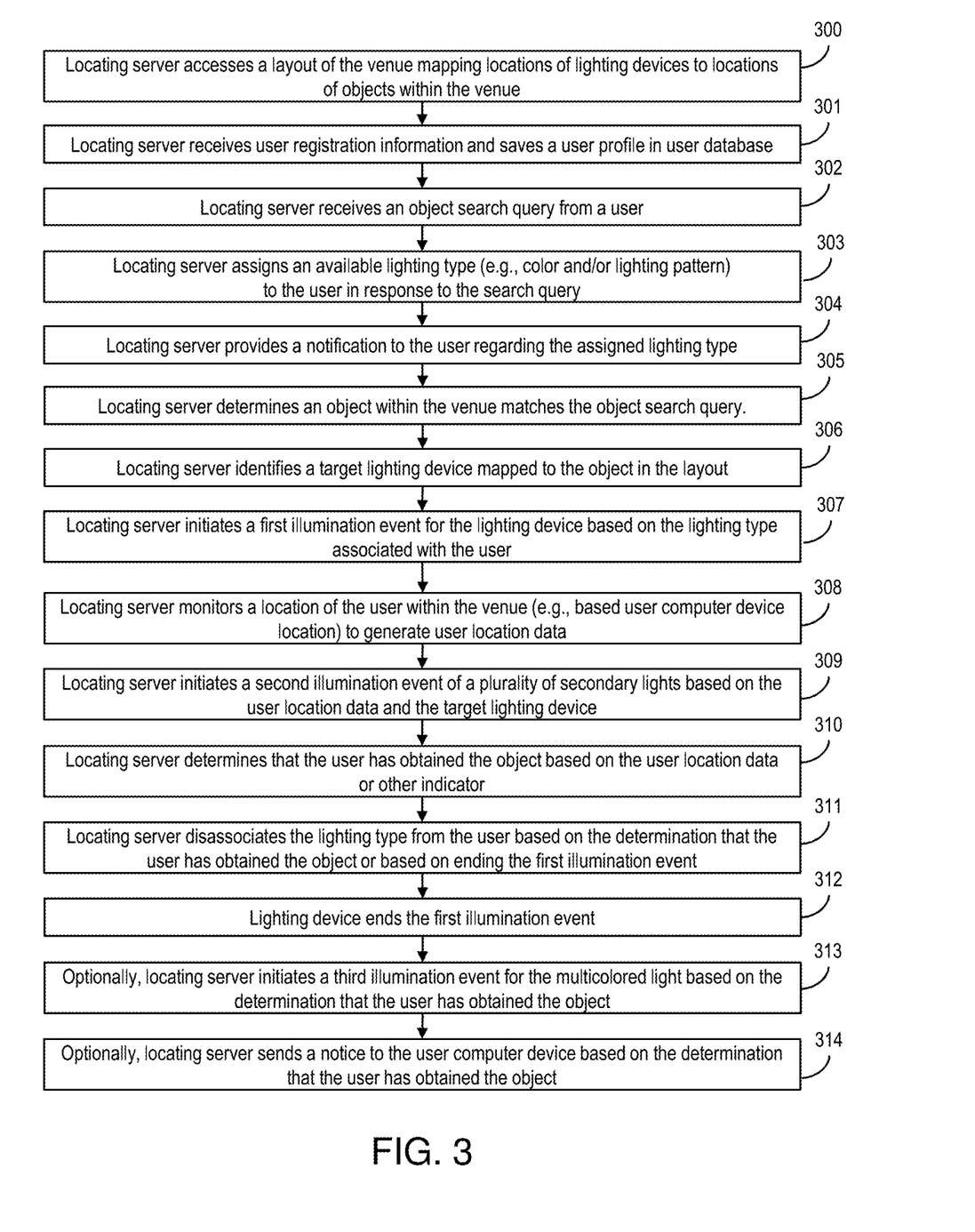
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the locating server 60 accesses a layout of the venue, wherein the layout maps locations of a plurality of objects in the venue to locations of a plurality of lighting devices 62 in the venue. In aspects, the locating server 60 stores the layout (also referred to herein as a map of lighting devices 62). Alternatively, the locating server 60 may access the map of lighting devices 62 on a remote computing device (not shown) via the network 50. In one example, the venue is a retail venue, wherein the plurality of objects are objects for sale, and the map of lighting devices 62 includes a mapping of lighting devices 62 to locations of the objects for sale. In aspects, objects mapped to locations in the layout of a venue may be stationary, or may be mobile objects. In the case of mobile objects, mapping of the objects to locations in the venue may be implemented on a continuous or periodic basis. For example, an "object" in accordance with embodiments of the invention may be a person, such as a sales associate.

Optionally, at step 301, the locating server 60 receives user registrations information and saves the user information in a user profile in the user database 73. User registration information may include information identifying the user, one or more user computer devices 63 of the user, user preference data (e.g., product preferences based on historic user purchases, etc.) or other data useful in implementations of the present invention. While some embodiments of the invention utilize user profile information in the implementation of steps, other embodiments do not require the use of user profile information, as will be discussed in more detail below.

At step 302, the locating server 60 receives an object search query from a user. The term object search query as used herein refers to a query including object identifying information, such as keywords, reference numbers, a bar code, or other information associated with an object that the user wishes to find within a venue. The object search query may be received directly, such as through a graphical user interface (GUI) of the locating server 60, or indirectly from a user computer device 63 via the network 50. The query may be directed to a specific product or a general category of product, such as vegan products or products that satisfy certain health desires, kosher products, products made in a particular country such as the United States of America (U.S.A.), etc. For example, the locating server 60 may receive a keyword query "wrench" from a user wishing to locate a wrench within a venue. In embodiments, the object search query may include other information, such as venue identifying information (e.g., the name of the venue, the address of the venue, etc.). The locating server 60 may utilize venue identifying information in the case where multiple venues are being services by the locating server 60. A user may utilize a variety of methods for submitting the object search query, including for example, speaking into a smartphone while in a venue, selecting an item on a smartphone, typing the name of a product for sale into a kiosk or other user computer device 63, or specifying a need for a produce while at home, wherein an illumination event is triggered later when the user is onsite at the venue. In embodiments, online product catalogs may be utilized by users to select objects of interest and communicate the objects of interest to the locating server 60.

At step 303, the locating server 60 associates or assigns one of a plurality of available lighting types from a pool or list of available of lighting types (e.g., available colors) to the user based on the object search query being received at step 302. In embodiments, a pool of available lighting types may be in the form of colors, lighting patterns (e.g., different flashing light patterns), lighting brightness levels (e.g., low, medium or high brightness levels) or a combination thereof. For example, the locating server 60 may receive an object search query "wrench" in accordance with step 302 and assign the available light color "red" to the user submitting the object search query. In another example, the locating server 60 may assign the light color "red", along with a flashing light pattern in the form of an alternating on and off pattern set at a specific frequency (e.g., one illumination of a red light color every second). In embodiments, when a lighting type from the pool of available lighting types is assigned to the user, it is taken out of the pool, and cannot be utilized by any other user while assigned. In aspects, the locating server 60 may assign a lighting type based on its visual distinctiveness from other lighting types in use within the venue at the time. For example, the locating server 60 may assign the color green to the user when the color red is already in use within the venue. In aspects, the location server 60 may assign an available lighting type based on the type of query and/or user information of the user. For example, a user searching for "vegan products" may be assigned the lighting type "green" when the locating server 60 associates the color green with vegan products and the lighting type "green" is available to be assigned. In another example, a lighting type comprising alternating red, white and blue lights may be assigned to a user when the user is searching for "products made in the U.S.A." and the lighting type is available for assignment. In embodiments, the locating server 60 may assign one of a plurality of lighting types to a user based at least in part on a user's request for a select lighting type. For example, a user may indicate with their object search query that they would like to be associated with the color "blue".

At step 304, the locating server 60 provides the user with a notification regarding the assigned lighting type in response to the object search query. In aspects, the notification is in the form of a message (e.g., text-based and/or image-based) telling the user to look for a light having the assigned lighting type. For example, if the assigned lighting type is the color "red", the notification may indicate that the user should look for a red light based on their object search query. In embodiments, the notification may be in the form of a color change on a display, such as a background on the user computer device 63 (e.g., smartphone or smartwatch) changing to the color red based on the color red being assigned to the user of the smartphone at step 303.

At step 305, the locating server 60 determines that an object within the venue at issue matches the object search query received at step 302, and thus is a matching object. In embodiments, the locating server 60 determines that an object within a list of available objects in the venue (e.g., inventory list or map of lighting devices from step 300) matches the object identifying information (e.g., keyword, reference numbers, bar code, etc.) of the object search query. The locating server 60 may determine an exact match or a general match. In one example, the locating server 60 determines that a keyword "wrench" in the object search query of step 302 matches a plurality of different types of wrenches located in the venue, wherein the different types of wrenches are associated with the category "tools" and the subcategory "wrenches". In this example, the locating server 60 determines a general match of the term "wrench" with the category of objects "wrench" associated with the venue. In another example, the locating server 60 may identify an exact match for a particular type of wrench identified by the object identifying information (e.g., stock keeping unit (SKU) number) in the object search query. In aspects, the locating server 60 may utilize the object search query along with historic user data (e.g., historic purchase data) to determine which objects may be relevant or irrelevant to the user, and may utilize this information in determining the matching object of step 305.

At step 306, the locating server 60 identifies a target lighting device 62 mapped to the matching object of step 305. In embodiments, the target lighting device 62 is a lighting device that is closest to the matching object determined at step 305. For example, the locating server 60 may determine that a lighting device 62 is the closed lighting device out of a plurality of lighting devices to a particular type of wrench identified as a matching object at step 305. In another example, the locating server 60 may determine that a lighting device 62 associated with an aisle of a venue is the lighting device most closely mapped to the matching object "tools". Thus it can be understood that a target lighting device 62 may be identified which is most closely associated with or mapped to the matching object (e.g., exact matching objects or general matching objects).

At step 307, the locating server 60 initiates a first illumination event for the target lighting device 62 identified at step 306 based on the lighting type associated with the user at step 303. The first illumination event may comprise the locating server 60 turning on or illuminating the lighting device 62 with a predetermined color, and/or illuminating the lighting device 62 at a predetermined pattern or frequency of illumination. In aspects, the lighting module 72 of the locating server 60 sends instructions to a target lighting device 62 to initiate a first illumination event. In embodiments, the lighting type comprises illuminated colors and/or patterns utilizing ceiling-mounted lighting devices 62. In aspects, the spacing of illuminated lights in a lighting pattern on a ceiling may be controlled based on many factors, such as user preferences, a user's visual acuity, the density of traversal paths being displayed at the same time, ceiling height, etc. The first illumination event may be initiated for a predetermined period of time, or until a predetermined trigger event occurs. For example, the locating server 60 may send a control signal through the network 50 to the control module 76 of the lighting device 62, wherein the control signal causes the lighting device 62 to illuminate as a blue light for a predetermined period of 2 minutes. In another example, the locating server 60 may send a control signal through the network 50 to the control module 76 of the lighting device 62, wherein the control signal causes the lighting device 62 to illuminate as a blue light until the lighting device 62 receives an end illumination signal from the locating server 60. In embodiments, the first illumination event is not initiated until a triggering event occurs, such as a user entering the venue. For example, in the case where a user may submit an object search query in accordance with step 302 when they are not within the venue, the first illumination event may not initiate until the locating server 60 determines that the user has entered the venue, such as through receiving an alert from the user computer device 63 that the user has entered the venue, or through monitoring the location of the user within the venue in accordance with step 308 below.

Optionally, at step 308, the locating server 60 monitors a location of the user within the venue to generate user location data. In embodiments, the locating server 60 utilizes existing mobile device tracking tools and methods to monitor the location of a user. For example, the locating server 60 may monitor the location of user computer devices 63 within the venue utilizing a beacon system (e.g., Bluetooth™ beacon), wherein beacons located at different locations within the venue detect the presence of nearby user computer devices 63. Alternatively the locating server 60 may receive location information from the user computer devices 63 when the user has enabled/authorized location tracking features.

Optionally, at step 309, the locating server 60 initiates a second illumination event of a plurality of secondary lights based on the user location data and the target lighting device

62. In embodiments, the second illumination event comprises the lighting of one or more of the plurality of secondary lights in a manner that guides a user from their current location (detected at step 308) towards the target lighting device 62 of step 306. In embodiments, the locating server 60 sends control instructions to one or more control modules 76 associated with the plurality of secondary lights, wherein the control instructions cause the plurality of secondary lights to illuminate in a predetermined manner, such as sequentially along a path between the user and the target lighting device 62. For example, the plurality of secondary lights may be illuminated sequentially as the user moves towards the target lighting device 62 to guide the user in the direction of the target lighting device 62. In another example, a series of red, white and blue lights may illuminate to guide a user towards products made in the U.S.A. In aspects, the locating server 60 may guide users to one or more complimentary objects or objects similar to the matching object determined at step 305. In aspects, a trail of lights in a pattern may disappear as a user traverses below illuminated lighting devices 62, thus visually freeing up ceiling real estate for other traversal patterns. A useful trail of lights in a pattern may be created, taking into consideration shopper traffic congestion in a venue. For example, the illuminated lighting devices 62 may guide shoppers around high traffic or congested areas of a venue during the second illumination event.

Optionally, at step 310, the locating server 60 determines that the user has obtained the object based on the user location data or other indicator. In embodiments, the locating server 60 determines that the user is within a predetermined distance from the object of interest (i.e., object determined at step 305), based on user location data obtained in accordance with step 308. In aspects, the locating server 60 determines that the user has obtained the object based on user input received, such as user input from the user computer device 63 indicating that the user has obtained the object. In embodiments, the locating server 60 determines that the user has obtained the object when the locating server 60 receives data from one or more sensors located within the venue (not shown), which indicates that the user has reached the location of or has obtained the object. In aspects, the locating server 60 determines that the user has obtained the object based on a predetermined period of time passing. For example, the locating server 60 may determine that a user has obtained an object after the target lighting device 62 has been illuminated for 2 minutes. It should be understood that a variety of data could be utilized by the locating server 60 as an indicator that the user has reached the object desired, and the invention is not limited to the examples discussed herein.

At step 311, the locating server 60 disassociates or unassigns the lighting type from the user based on the determination that the user has obtained the object or upon ending the first illumination event. In embodiments, the locating server 60 disassociates the lighting type from the user based on a predetermined amount of time passing since the initiation of the first illumination event at step 307, wherein the first illumination event automatically ends after the predetermined amount of time has passed. In aspects, the locating server 60 disassociates the lighting type from the user and returns the lighting type to the list of available lighting types that may be assigned to other users at the venue. For example, a lighting color "red" associated with a user may be disassociated from the user and returned to a list of available lighting colors that may then be associated with another user in accordance with step 303 of FIG. 3. Thus, in embodiments, a finite number of illumination types may be recycled for use amongst a plurality of users of the venue, wherein the same illumination type is never used for more than one user at a time.

At step 312, the target lighting device 62 (illuminated at step 307) ends the first illumination event. In embodiments, the locating server 60 sends instructions to the lighting device 62 to end the first illumination event based on the determination at step 310 that the user has obtained the object. In aspects, the locating server 60 may determine that the user has obtained the object based on a predetermined amount of time passing after the first illumination event is initiated. In another example, the locating server 60 may switch the target lighting device 62 from the first illumination event based on the lighting type (e.g., red illumination of the target lighting device) to an alternative default illumination setting (e.g., white light setting). In this example, the lighting devices 62 may be utilized for general venue lighting, as well as targeted object illumination in accordance with embodiments of the invention.

Optionally, at step 313, the locating server 60 initiates a third illumination event based on the determination that the user has obtained the object. For example, the locating server 60 may send control instructions to the control module 76 of the target lighting device 62 to switch the color of the target lighting device 62 from a color associated with the user at step 303, to a default color or lighting pattern indicating that the user has reached the object. In one example, the locating server 60 may cause the target lighting device 62 to illuminate with a red light until the user location data indicates that the user is within a predetermined distance from the object, wherein the locating server 60 causes the target lighting device 62 to flash red for five seconds to indicate that the user is in the correct location within the venue. It should be understood that, in embodiments, step 313 could be implemented before step 312.

Optionally, at step 314, the locating server 60 sends a notice to the user computer device 63 based on the determination that the user has obtained the object in accordance with step 310. The notice may include, for example, a text message indicating that the user has reached the object of interest.

Figure 4:
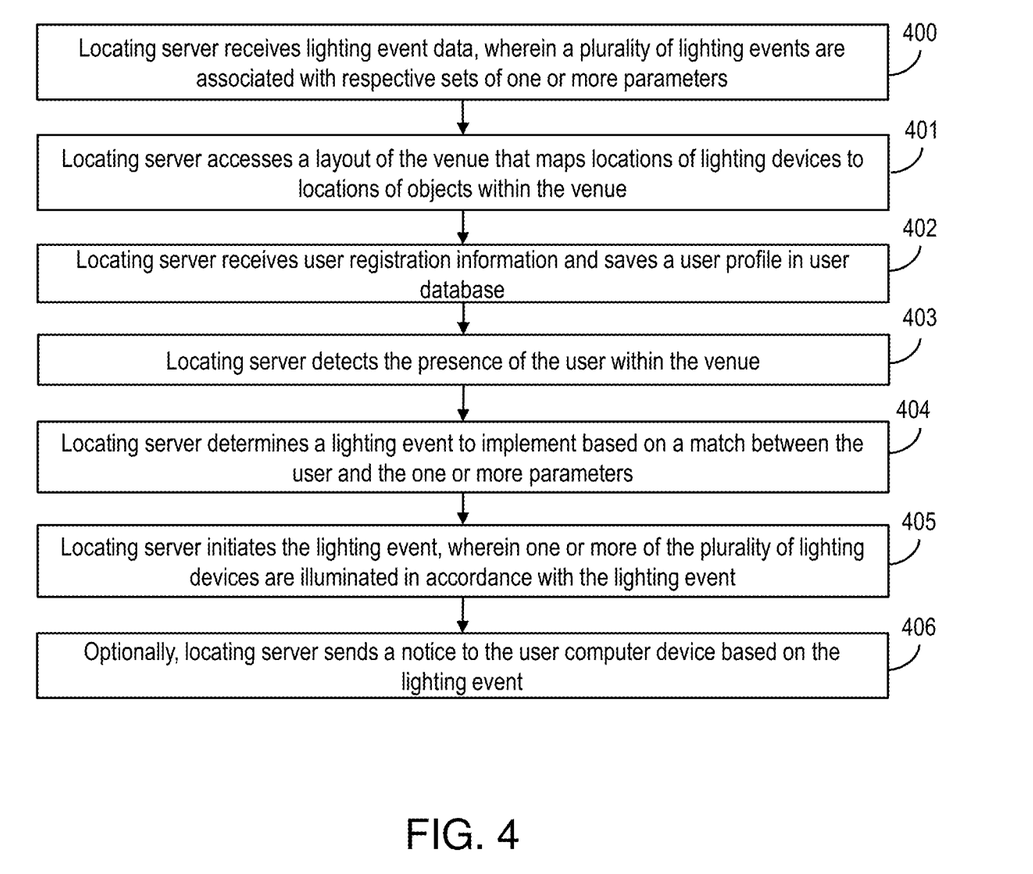
FIG. 4 shows an exemplary use scenario in accordance with embodiments of the invention.

FIG. 4 shows a flowchart of a method in accordance with aspects of the invention. Steps of the method of FIG. 4 may be performed in the environment illustrated in FIG. 2, and are described with reference to elements shown in FIG. 2. Embodiments according to FIG. 4 enable the system of FIG. 2 to be utilized for customized and/or targeted marketing events within a venue.

At step 400, the locating server 60 receives lighting event data, wherein a plurality of lighting events are associated with respective sets of one or more parameters. In aspects, the lighting event data is stored in the lighting event database 74. As used herein, the term lighting event refers to an event wherein one or more lighting devices 62 are illuminated based on predetermined illumination instructions associated with one or more triggering parameters. The parameters may be associated with certain types of products, such as products that are vegan or satisfy certain health desires, kosher products, products made in a particular country, etc. Additionally or alternatively, the parameters may be associated with certain groups of users. For example, a first lighting event may be associated with the triggering parameter "users who identify as vegetarian", wherein the lighting event is also associated with instructions to illuminate one or more of the lighting devices 62 in the venue according to predetermined illumination instructions when a user (e.g., user data in the user database 73) is determined to match the triggering parameter.

At step 401, the locating server 60 accesses a layout (map of lighting devices) mapping locations of the plurality of objects within the venue to one or more lighting devices 62 in the venue in the same manner as step 300 of FIG. 3. The locating server 60 may store a map of lighting devices 62 or may access the map of lighting devices 62 on a remote computing device (not shown) via the network 50. The venue may be a retail venue, wherein the plurality of objects are objects for sale, and the map of lighting devices 62 includes a mapping of lighting devices 62 to locations of the objects for sale.

At step 402, the locating server 60 receives user registration information and saves a user profile in the user database 73 in the same manner as step 301 of FIG. 3. The user profiles of a plurality of users may be stored in the user database 73, and may include user information as authorized by the user. For example, a user may enable the locating server 60 to store user information of the user indicating that the user identifies as a vegetarian.

At step 403, the locating server 60 detects the presence of the user within the venue. Step 403 may be performed in accordance with step 307 of FIG. 3. Existing tools and methods for monitoring the location of a user may be utilized in accordance with step 403, such as monitoring the location of the user computer device 63 within the venue. In embodiments, the locating server 60 may recognize a customer ID associated with a user (e.g., based on the user database 73).

At step 404, the locating server 60 determines a lighting event to implement based on a match between the user and the one or more parameters. For example, the locating server 60 may detect the presence of a user computer device 63 in accordance with step 403, determine that the user associated with the user computer device 63 identifies as a vegetarian (based on user profile information), and determine that a lighting event to highlight a new brand of vegetarian meals should be implemented based on the user profile information. In embodiments, the lighting event may be associated with a complimentary or similar object to the matching object of step 305 of FIG. 3. In aspects, the locating server 60 may determine a lighting event to implement based on a predetermined lighting event matching a coupon associated with the user. Optionally, the locating server 60 may infer or predict a user's needs or desires without the user submitting an object search query, and may provide the user with a notification through the use computer device 63 in a manner similar to step 304 of FIG. 3. For example, the locating server 60 may determine that the user's profile indicates that they would be interested in raspberries, wherein the locating server 60 determines a lighting event associated with raspberries should be initiated and sends a notification to the user indicating that they should look for the purple light associated with the lighting event. Optionally, the locating server 60 may discover patterns in relationships between entities, such as objects for sale and customers, as evidenced by historic purchase behavior data. Thus, when a customer returns to a store, the locating server 60 may estimate, with a certain degree of confidence, what the customer may be seeking and determine an associated lighting event based thereon. In aspects, the degree of confidence may affect a brightness of a light pattern initiated at step 405.

At step 405, the locating server 60 implements the lighting event determined at step 404, wherein one or more of the lighting device 62 are illuminated in accordance with lighting instructions associated with the lighting event. For example, the locating server 60 may initiate illumination of a lighting device 62 that is determined to be closest to the new brand of vegetarian meals that are intended to be highlighted by the lighting event, wherein the lighting device 62 is illuminated as a flashing red light (or other predetermined illumination type).

Optionally, at step 406, the locating server 60 sends a notice to the user computer device 63 based on the lighting event. For example, the locating server 60 may send a message to the user computer device 63 indicating that the user should look for the flashing red light to find a sale on the new brand of vegetarian meals to be highlighted by the lighting event.

While aspects of the present invention may track the location of user devices, location tracking may occur on an "opt-in" basis in which a user provides explicit permission for location to be tracked within a merchant facility. Further, location tracking may be implemented in accordance with applicable privacy laws and may be discontinued at any time for users who have revoked permission for location tracking. Moreover, to the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Steps of FIG. 4 can be conducted in conjunction with steps of FIG. 3. For example, the locating server 60 may initiate a lighting event based on a match between the user and one or more parameters associated with the lighting event in accordance with FIG. 4, while also initiating a first illumination event in accordance with FIG. 3.

Figure 5:
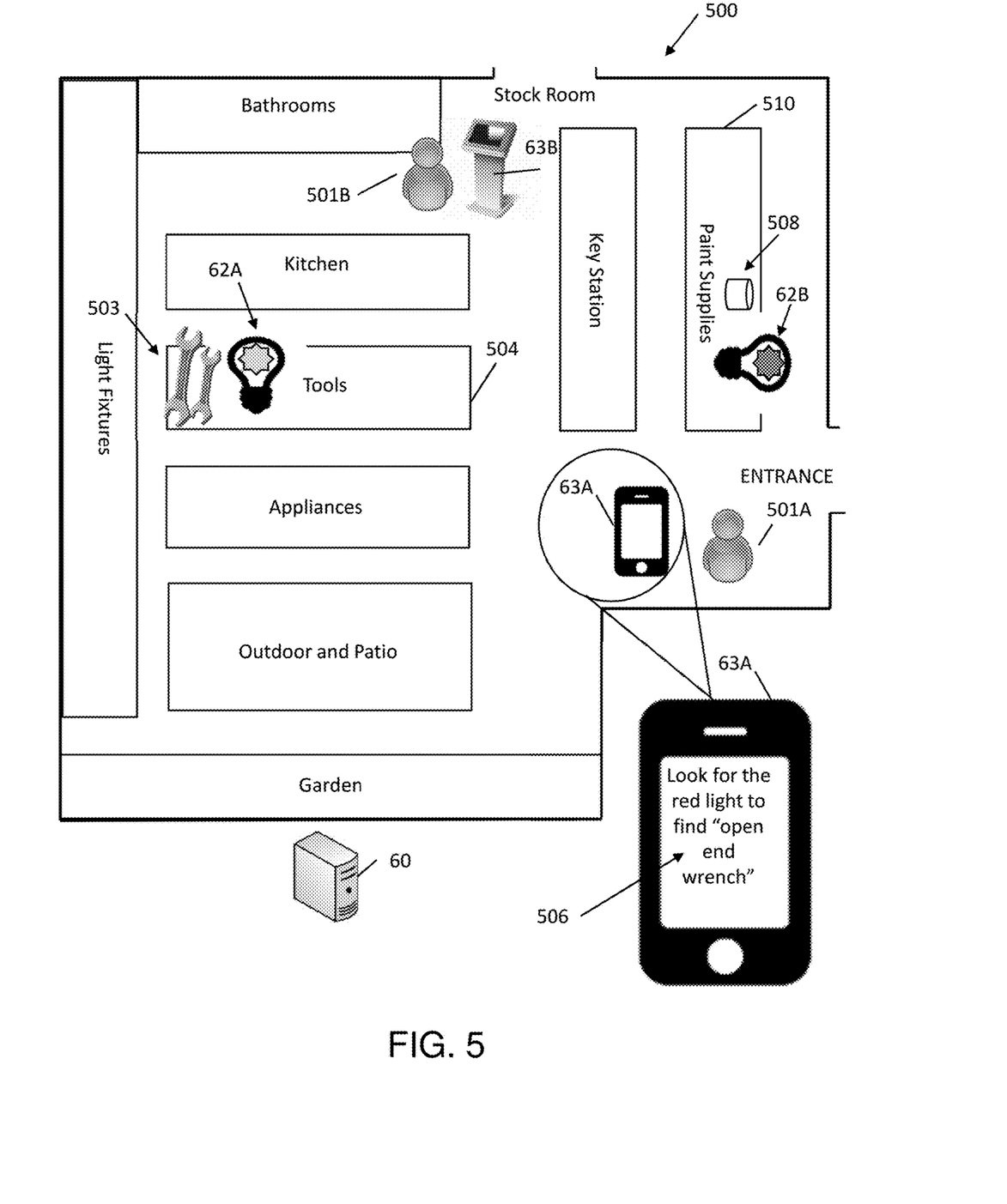
FIG. 5 shows an exemplary use scenario according to embodiments of the invention.

FIG. 5 illustrates an exemplary scenario of the present invention, wherein a venue 500 is shown including components of the environment of FIG. 2. Method steps discussed in FIG. 3 may be implemented in the venue 500 of FIG. 5.

In the exemplary scenario shown, a first user 501A enters an object search query for an "open end wrench" into the user computer device 63A, and the locating server 60 (shown onsite in this example) receives the object search query in accordance with step 302 of FIG. 3. The locating server 60 then associates the lighting type of "red light" to the first user 501A in accordance with step 303 of FIG. 3. The locating server 60 also determines that a plurality of object matches 503 are found in an aisle 504 of the venue 500 in accordance with step 305 of FIG. 3. In accordance with step 306 of FIG. 3, the locating server 60 also identifies a target lighting device 62A as being the lighting device closest to the object matches (open end wrenches) 503 in aisle 504. In this exemplary scenario, lighting device 62A is in the form of a multicolor-enabled light, which is configured to be selectively illuminated with different colors (e.g., red, yellow, green, blue, purple, etc.). In this scenario, the locating server 60 sends the user computer device 63A a notification 506 telling the first user 501A to look for a red light in response to the user's search query, in accordance with step 304 of FIG. 3. The locating server 60 then initiates a first illumination event of the lighting device 62A in accordance with step 307 of FIG. 3, wherein the lighting device 62A is illuminated as a red light. In this scenario, the locating server 60 sends a control signal to the control module (e.g., 76 in FIG. 3) of the lighting device 62A to implement the first illumination event for a predetermined time of 2 minutes. In accordance with step 312, after 2 minutes has passed, the lighting device 62A ends the first illumination event, and the lighting type "red" is released back into a pool of available lighting types that may be assigned to users in accordance with step 311 of FIG. 3. In this scenario, the lighting device 62A ends the first illumination event by turning off the lighting device 62A after 2 minutes.

Still referring to FIG. 5, a second user 501B is also shown entering an object search query for "brand X primer" into a user computer device 63B in the form of a customer service kiosk. In accordance with steps 302, 303 and 305 of FIG. 3, the locating server 60 receives the object search query for "brand X primer", associates the available light color "blue" to user 501B, and determines that an object 508 matches the object search query based on a map of locations of objects within the venue 500. The locating server 60 also sends a notification (not shown) to the user computer device 63B indicating that the user should look for the blue light. In accordance with step 306 of FIG. 3, the locating server 60 also identifies a target lighting device 62B as being the lighting device in the venue 500 closest to the object 508 in aisle 510, based on mapping data. In this exemplary scenario, lighting device 62B is also in the form of a multicolor-enabled light, which is configured to be selectively illuminated with different colors. Thus, the locating server 60 initiates a first illumination event of the lighting device 62B in accordance with step 307 of FIG. 3, wherein the lighting device 62B is illuminated as a blue light. In this scenario, the locating server 60 sends a control signal to the control module (e.g., 76 in FIG. 3) of the lighting device 62B to implement the first illumination event for a predetermined time of 2 minutes. In accordance with step 311, after 2 minutes has passed, the lighting device 62B ends the first illumination event. In this example, the lighting device 62A ends the first illumination event by turning off the lighting device 62A. The locating server 60 disassociates the light color "blue" from the user 501B, and the light color "blue" is returned to a pool of potential light colors that may be assigned to a user in accordance with step 303 of FIG. 3.

While examples herein discuss objects for sale in a retail environment, it should be understood that other types of objects could be the subject of a user's search query. For example, a user may submit a search query looking for a place (e.g., bathrooms, checkout, etc.), or a person (e.g., sales associate).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for automated personalized customer service. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computer device, user registration information of a user which includes information identifying the user, one or more user computer devices of the user, and user product preferences based on a user's historic purchase data;
determining, by the computing device, at least one object from a plurality of objects within a venue matches a search query received from the user via the one or more user computer devices, wherein the venue includes a plurality of multicolor-enabled lighting devices configured to selectively illuminate with one of a plurality of colors;
determining, by the computer device, objects irrelevant to the user by utilizing the search query along with the user's historic purchase data;
assigning to the user, by the computing device, a select lighting type from a pool of available lighting types, the select lighting type including at least one of the plurality of colors, wherein the select lighting type is not available for the computing device to assign to other users while assigned to the user;
providing, by the computing device, a notification to the user to look for the select lighting type, wherein the notification is a color change on a display of the one or more user computer devices;
selecting, by the computing device, a target lighting device from the plurality of multicolor-enabled lighting devices within the venue, the target lighting device being associated with the at least one object;
sending, by the computing device, first instructions to a controller of the target lighting device, thereby automatically initiating a first illumination event of the target lighting device based on the select lighting type;
sensing, by the computing device, that the user is within a predetermined distance of the at least one object;
sending, by the computing device, second instructions to the controller of the target lighting device, thereby automatically initiating a second illumination event of the target lighting device different from the first illumination event based on the determining the user is within the predetermined distance of the at least one object, wherein the second illumination event occurs for a predetermined amount of time;
guiding, by the computing device, the user to one or more objects complimentary to the at least one object;

discovering, by the computing device, patterns in relationships between the user and objects for sale within the venue as evidenced by the user's historic purchase behavior data;

estimating, by the computing device, with a degree of confidence what the user is seeking in response to the user returning to the venue based on the patterns; and determining, by the computing device, an associated lighting event based on the degree of confidence in response to the user returning to the venue.

2. The method of claim 1, further comprising:

selecting, by the computing device, the select lighting type from the group consisting of a lighting color, a lighting pattern, a lighting brightness, and combinations thereof; and determining, by the computing device, that the user has entered the venue, wherein the initiating the first illumination event of the target lighting device is further based on the determining that the user has entered the venue.

3. The method of claim 1, further comprising:

accessing, by the computing device, stored user information about the user; and selecting, by the computing device, the select lighting type based on the user information about the user.

4. The method of claim 1, further comprising:

accessing, by the computing device, a layout of the venue, wherein the layout maps locations of the plurality of objects to locations of the plurality of multicolor-enabled lighting devices, and wherein the selecting the target lighting device is based on the layout of the venue; and selecting, by the computing device, a color of the lighting type based on a type of the search query.

5. The method of claim 1, wherein the plurality of lighting devices multicolor-enabled lighting devices are ceiling-mounted multicolor-enabled lighting devices.

6. The method of claim 1, further comprising:

ending, by the computing device, the second illumination event after the predetermined amount of time; and initiating, by the computing device, a default illumination setting of the target lighting device.

7. The method of claim 6, further comprising disassociating, by the computing device, the select lighting type from the user, and returning the select lighting type to the pool where it is available to the computing device to assign to the other users after the disassociating.

8. The method of claim 7, further comprising:

assigning to another user, by the computing device, the select lighting type selected from a plurality of available lighting types after disassociating the select lighting type from the user, based on receipt of another search query from the other user;

guiding, by the computing device, other shoppers of the venue around a congested area within the venue during the second illumination event;

determining, by the computing device, the user has obtained the at least one object based on a predetermined period of time passing;

determining, by the computing device, the predetermined period of time passing because the target lighting device has been illuminated for 2 minutes; and initiating, by the computing device, a third illumination event based on the determination that the user has obtained the at least one object.

9. A computer program product for automated personalized customer service, the computer program product comprising a computer readable storage medium having program instructions embodied therewith, the program instructions executable by a computing device to cause the computing device to:

receive user registration information of a user which includes information identifying the user, one or more user computer devices of the user, and user product preferences based on a user's historic purchase data;

determine at least one object from a plurality of objects within a venue matches a search query received from the user via the one or more user computer devices, wherein the venue includes a plurality of multicolor-enabled lighting devices configured to selectively illuminate with one of a plurality of colors;

determine objects irrelevant to the user by utilizing the search query along with the user's historic purchase data;

assign a select lighting type from a pool of available lighting types to the user, the select lighting type including at least one of the plurality of colors, wherein the select lighting type is removed from the pool of available lighting types while assigned to the user;

provide a notification to the user to look for the select lighting type, wherein the notification is a color change on a display of the one or more user computer devices;

select a target lighting device from the plurality of multicolor-enabled lighting devices within the venue, the target lighting device being associated with the at least one object;

initiate a first illumination event of the target lighting device based on the select lighting type;

sense that the user is within a predetermined distance of the at least one object;

initiate a second illumination event of the target lighting device different from the first illumination event based on the determining the user is within the predetermined distance of the at least one object, wherein the second illumination event occurs for a predetermined amount of time;

guide other shoppers of the venue around a congested area within the venue during the second illumination event;

un-assign the select lighting type from the user, wherein the select lighting type is returned to the pool of available lighting types; and guide the user to one or more objects complimentary to the at least one object;

discover patterns in relationships between the user and objects for sale within the venue as evidenced by the user's historic purchase behavior data;

estimate with a degree of confidence what the user is seeking in response to the user returning to the venue based on the patterns; and determine an associated lighting event based on the degree of confidence in response to the user returning to the venue.

10. The computer program product of claim 9, wherein the program instructions further cause the computing device to access a layout of the venue, wherein the layout maps locations of the plurality of objects to locations of the plurality of lighting devices, and wherein the selecting the target lighting device is based on the layout of the venue.

11. The computer program product of claim 9, wherein the program instructions further cause the computing device to receive the search query from a customer service kiosk at the venue.

12. The computer program product of claim 9, wherein the program instructions further cause the computing device to:
 initiate an end to the second illumination event after the predetermined amount of time; and
 initiate a default illumination setting of the target lighting device.

13. The computer program product of claim 9, wherein the program instructions further cause the computing device to assign the select lighting type to another user after the un-assigning the select lighting type from the user.

14. A system for automated personalized customer service, comprising:
 a plurality of multicolor-enabled lighting devices configured to selectively illuminate with one of a plurality of colors;
 a processor, a computer readable memory and a computer readable storage medium associated with a computing device;
 program instructions to receive user registration information of a user which includes information identifying the user, one or more user computer devices of the user, and user product preferences based on a user's historic purchase data;
 program instructions to receive a search query from the user via the one or more user computer devices;
 program instructions to determine objects irrelevant to the user by utilizing the search query along with the user's historic purchase data;
 program instructions to determine that at least one object from a plurality of objects within a venue matches the search query;
 program instructions to assign to the user a select color from the plurality of colors, wherein the select color is removed from a list of available colors once assigned to the user, and the color is selected based on a type of the search query received from the user;
 program instructions to select a target lighting device from the plurality of lighting devices based on the target lighting device being associated with the at least one object;
 program instructions to provide a notification to the user indicating that the user should look for the target lighting device with the select color, wherein the notification is a color change on a display of the one or more user computer devices;
 program instructions to determine that the user has entered the venue;
 program instructions to initiate a first illumination event of the target lighting device to illuminate the target lighting device in the select color, wherein the initiating the first illumination event of the target lighting device is based on the determining that the user has entered the venue;
 program instructions to sense that the user is within a predetermined distance of the at least one object;
 program instructions to automatically initiate a second illumination event of the target lighting device different from the first illumination event based on the determining the user is within the predetermined distance of the at least one object, wherein the second illumination event occurs for a predetermined time period;
 program instructions to guide other shoppers of the venue around a congested area within the venue during the second illumination event;
 program instructions to initiate an end to the second illumination event after the predetermined amount of time;
 program instructions to initiate a default illumination setting of the target lighting device;
 program instructions to guide the user to one or more objects complimentary to the at least one object;
 program instructions to determine that the user has obtained the at least one object based on a predetermined period of time passing;
 program instructions to determine the predetermined period of time passing because the target lighting device has been illuminated for 2 minutes;
 program instructions to initiate a third illumination event based on the determination that the user has obtained the at least one object;
 program instructions to discover patterns in relationships between the user and objects for sale within the venue as evidenced by the user's historic purchase behavior data;
 program instructions to estimate with a degree of confidence what the first user is seeking in response to the first user returning to the venue based on the patterns; and
 program instructions to determine an associated lighting event based on the degree of confidence in response to the first user returning to the venue,
 wherein the program instructions are stored on the computer readable storage medium for execution by the processor via the computer readable memory.

15. The system of claim 14, further comprising program instructions to access a layout of the venue, wherein the layout of the venue maps locations of the plurality of objects to locations of the plurality of lighting devices, and wherein the selecting the target lighting device is based on the layout of the venue.

16. The system of claim 14, further comprising program instructions to end the first illumination event.

17. The system of claim 16, further comprising program instructions to un-assign the select color from the user, wherein the select color is returned to the list of available colors upon un-assigning the select color.

18. The system of claim 17, further comprising program instructions to assign the select color to another user after the un-assigning the select color in response to receiving another search query from the other user.

19. The computer program product of claim 9, wherein the program instructions further cause the computing device to:
 access stored user information about the user; and
 select the select lighting type based on the user information about the user.

20. The system of claim 14, further comprising:
 program instructions to receive a color preference from the user; and
 program instructions to select the select lighting type based on the color preference of the user.

* * * * *